United States Patent Office 3,514,280
Patented May 26, 1970

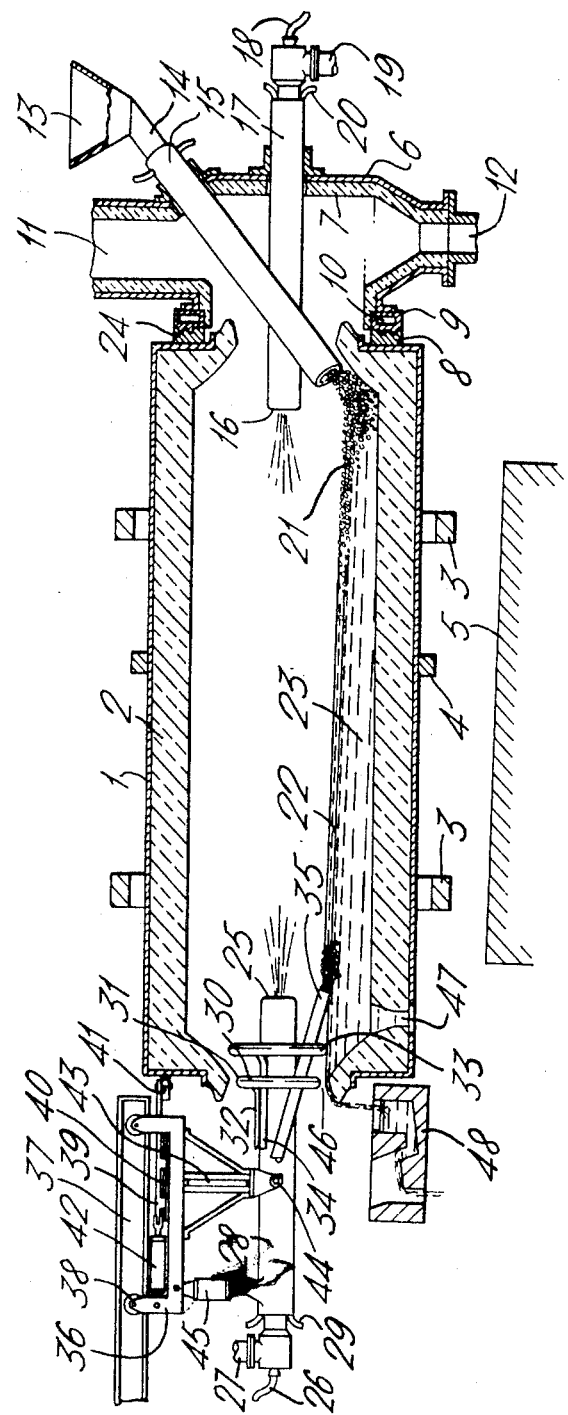

3,514,280
CONTINUOUS STEELMAKING METHOD
William Lyon Sherwood, P.O. Box 2161, West
Vancouver 3, British Columbia, Canada
Continuation of application Ser. No. 398,519, Sept. 23,
1964. This application Oct. 19, 1967, Ser. No. 676,654
Int. Cl. C21b 13/08
U.S. Cl. 75—43                                        18 Claims

ABSTRACT OF THE DISCLOSURE

Steel is produced continuously by introducing pieces of metallic iron, along with fluxing materials and alloying materials, into an elongated steelmaking zone. The steelmaking zone is heated directly at the charge end to form a melting zone and also directly at the discharge end to form a refining zone. The charge materials are fused in the melting zone to form liquid metal and slag phases in close contact. The metal and slag are further advanced into the refining zone where the refining reactions take place between metal and slag until liquid steel of the desired composition and temperature is obtained prior to discharge and subsequent casting. Firing is preferably countercurrent to the flow of metal which enables completely independent control of temperature for refining and discharge. The method is most appropriately conducted in an elongated rotary furnace having a burner at each end directed through a restricted annular opening. The rotary furnace walls thereby provide continual agitation and advancing action for the charge, and also increase rate of heat transfer and chemical reactions.

---

This application is a continuation of my copending application Ser. No. 398,519, filed Sept. 23, 1964, now abandoned; and a continuation-in-part of my copending application Ser. No. 369,523, filed May 22, 1964, now abandoned.

The invention is a method for the continuous production of steel.

There are a number of direct reduction processes in use for the solid-state reduction of iron ore concentrate to yield metallic particles or pellets of reduced iron, generally called sponge iron, and having a predictable, uniform size range and chemical composition. Iron and steel scrap and pig iron may also be prepared to have a controlled size and composition. Such materials usually differ from a desired cast steel mainly with respect to physical form, gangue content and metal chemistry. To obtain liquid steel from them, the only steps required are melting to separate gangue into a slag phase, adding of controlled quantities of fluxing materials and alloying materials, and refining of the liquid steel obtained to meet requirements for chemical uniformity and casting temperature. In the commonly known methods, these functions are performed batchwise, using processes designed primarily to accommodate liquid charge materials or solid charge materials of irregular size and composition. These processes include, for example, the open hearth, Bessemer converter, oxygen converter, rotary oxygen converter and electric-arc furnace in which varying mixtures of liquid blast furnace hot metal and solid iron and steel scrap ar eemployed in the charge. It will be apparent that these processes are not continuous in nature or designed specifically to utilize a charge material comprising pieces of metallic iron of limited and controlled size.

Rotary furnaces have also been proposed for continuous steelmaking, and have achieved some success with a charge comprising liquid hot metal which requires both oxidation and refining. In dealing with solid charge, however, the importance of an elongated form to provide reaction zones of substantially greater length and cross section, in combination with independent heat sources for melting and refining, has not apparently been recognized. A continuous rotary furnace for steelmaking from a solid charge requires concentrated heat for melting and at the same time independent heating for regulation of refining and discharging temperatures. This heating is most logically provided by two independent burners, one at each end of an elongated rotary furnace.

It is therefore a principal object of this invention to provide a method for continuous steelmaking having the inherent advantages of continuous operation over batch operation, and in which different operation stages are conducted simultaneously and continuously with respect to time, and with respect to space, charge materials in process are advanced successively and continuously along an elongated reaction zone.

It is another principal object of this invention to provide a continuous steelmaking method within an elongated rotary furnace which is directly heated at the charge end for melting and independently and separately at the discharge end for refining. In this way, separate and controlled heat input and temperature for melting and refining are obtained. The importance of this vital feature has not apparently been recognized in attempted prior art methods for continuous steel manufacture.

Another principal object of this invention is to provide an improved steelmaking method and apparatus designed specifically for a charge comprising pieces of metallic iron of relatively small uniform size, and particularly, reduced sponge iron particles or pellets.

Another object of the present invention is to provide a process particularly suitable for use in combination with a preceding continuous reduction operation and a succeeding continuous casting operation.

A further object of the present invention is to facilitate a nearly complete combustion of furnace gases, thereby minimizing loss in the exhaust gas of heating values in unburned fuel, for example, unburned carbon monoxide.

A further object is to provide a melting and refining technique capable of utilizing a wide variety of fuels in the form of liquids, gases or powdered coal.

Still another object is to provide, by the agitating action of the rotating process equipment, a mixing and intimate contact of metal and slag, with resulting rapid heat transfer and rate of chemical reactions, thereby enabling a close approach to chemical equilibrium conditions and close control of steel composition to be achieved.

The present invention comprises a continuous steelmaking method in an elongated rotary furnace apparatus which is separately heated at the charge end and also at the discharge end. A charge comprising pieces of metallic iron, preferably in the form of pellets or granules of uniform composition and size, along with fluxes and alloys as required, are introduced into the charge end of the rotary furnace where heat is supplied directly while the charge is advanced along the furnace until melting occurs forming liquid metal and slag phases in close contact. The liquid steel and slag are then refined by further heating as they are agitated and advanced by the rotary furnace wall movement until liquid steel having the desired composition and temperature is obtained, this direct heat for refining being supplied independently at the furnace discharge end, following which the steel and slag are discharged in preparation for subsequent casting.

The method is employed particularly to good advantage in combination with a solid-state iron ore reduction operation which is conducted simultaneously, the sponge iron product obtained from the reduction operation comprising the charge of metallic iron pellets for continuous steelmaking.

Preferably, the furnace is arranged to provide for discharging liquid metal and slag in a continuous or semi-continuous manner, avoiding build-up of slag or metal along discharge opening surfaces.

The preferred apparatus also includes an adjustably positioned slag barrier arranged to regulate the slag flow and linking means with the furnace arranged to adjust automatically for unavoidable furnace movements during operation.

A gas curtain arrangement as a seal for the discharge end opening designed to remain effective despite furnace and burner movements, is also provided in the preferred embodiment.

Whilst heat is supplied independently at either end of the rotary furnace, at the charge end primarily for melting of the pellets, and at the discharge end primarily for refining and heating the liquid steel and slag to casting temperature, the general movement of hot gases within the furnace is preferably countercurrent to the flow of charge mixture, flowing in sequence first through the refining zone and then the melting zone, the gases being expelled from the charge end of the furnace.

Other features which may be included within the scope of the invention will be hereinafter described and are referred to in the appended claims.

The practice of the method of this invention will now be described in detail with reference to the drawing, FIG. 1, which shows diagrammatically, in elevation and partly in section, a suitable furnace for conducting continuous steelmaking.

Referring to FIG. 1, the rotary furnace comprises a body consisting of a cylindrical steel shell 1 lined with refractory material 2. The furnace is supported for rotation relative to foundation supports 5, on rollers 3, which rest on conventional trunnions (not shown) mounted on the foundation supports 5 in known manner.

The shell is rotatable by a motor and train of speed-reducing gears (not shown), the last gear of which meshes with bull gear 4 secured around the reactor shell. Various speeds of rotation up to 50 r.p.m. may be employed.

The shell may be mounted horizontally, but is generally inclined downwardly from the charge and towards the discharge end.

Iron metallics, fluxes and alloys are introduced into feed hopper 13, and flow by gravity through inclined feed pipe 14, cooled by water jacket 15, into the mixture of partially melted charge material 21 within the melting zone of the rotary furnace. The fluxing materials and alloying materials are employed according to known steelmaking practice, the quantity and type depending mainly upon the quantity and composition of gangue and impurities in the metallic charge, and the desired composition of the finished steel. Other considerations in selecting additions are overall raw material cost, slag fluidity and propensity of slag to erode furnace refractories. It should also be noted that the charge materials are introduced directly into a pool of fused slag and metal within the furnace, thereby minimizing any tendency of the charge to agglomerate and adhere to the inner furnace walls.

The furnace head 6, provided with refractory lining 7 to protect the steel shell and to prevent excessive heat loss, functions as a support for feed pipe 14, and charge end burner 16 and also acts as a conduit for removal of exhaust gases. The furnace head 6 is maintained in a fixed relation to the furnace in known manner, by means of contact between the interlocking grooved, lubricated sealing surfaces 24 of stationary annular head positioning ring 9, attached to furnace head 6, and rotating head positioning ring 8 attached to furnace shell 1. Uniform contact pressure around the circumference of these surfaces is maintained by biasing apparatus (not shown) such as an assembly of cables and counterweights. The sealing surfaces may be cooled by water jacket 10.

Direct heat for melting is supplied by means of charge end burner 16. Fuel and air or oxygen, which may be preheated, are supplied by way of burner fuel inlet 18 and burner air inlet 19. The burner water jacket 17 is supplied with cooling water by means of water inlet and outlet pipes 20. Exhaust gas expelled from the furnace is withdrawn by way of exhaust gas duct 11, the coarse dust particles dropping into dust collector duct 12.

The liquid metal 23 and liquid slag 22 are continually agitated and advanced from the charge end to the discharge end of the furnace by the rotary wall movement. In this way, a close approach to chemical equilibrium between slag and metal is achieved, thereby obtaining close control of steel composition, high recovery of valuable alloys in the steel, and low slag iron oxide with corresponding increased yield. A second burner 25, also provided with a fuel inlet 26, air inlet 27 and water jacket 28 supplied by water inlet and outlet pipes 29, is directed into the furnace through the annular discharge opening 46, supplying direct heat for refining, and indirect heat for melting.

In the furnace being described which may discharge liquid by overflowing through a restricted opening, it will be appreciated that the slag will tend to move more quickly through the furnace than the metal. To control the slag discharge rate, the adjustably-positioned slag barrier 33 is provided. This barrier 33 is attached to burner 25 and may consist of a refractory material, or a wate cooled shell of heat-resisting material, supplied with water by water inlet and outlet pipes 34.

In order to prevent the free transfer of gases through the discharge opening 46 of the reactor, a sealing curtain of high-velocity gas may be employed. The curtain is emitted from the annular slit 31 in header pipe 30, which is supplied with the sealing gas under pressure by way of supply pipe 32. The curtain gas impinges upon the inner surface of discharge opening 46, thereby substantially preventing axial flow of gases through the opening despite static pressure differences between the atmosphere and furnace interior.

To accomplish the adjustment movement of the burner assembly, the discharge end burner 25 is mounted at the lower end of burner support brackets 43 suspended from carriage 36 having wheels 38 running on tracks 37. Adjustment of the burner position in the axial direction relative to the discharge opening 46 of the furnace is effected by adjusting the distance between a roller 41 and the carriage 36 by movement of bearing shoes 39 sliding on a track 40, under the action of a horizontally arranged hydraulic ram 42 mounted on the carriage 36. Contact between roller 41 and the end wall of the furnace may be maintained by means of biasing apparatus (not shown) such as counter-weights attached by cable to the carriage assembly through pulleys.

Adjustment of the burner and slag barrier position in the vertical direction relative to the discharge opening 46 is effected by pivotally mounting the burner 25 on horizontally disposed pivot bearings 44. The burner 25 is pivoted about the bearings 44 by a vertically arranged hydraulic ram 45 connected between the rear end of the burner 25 and the carriage 36. This arrangement provides easy removal of the burner from the reactor for repair or to provide access to the reactor interior through the discharge opening 46.

Heat may be applied to the inner walls of the discharge opening 46, if necessary to prevent any tendency of slag or metal to solidify and adhere to the refractory, by arranging burners (not shown) in a manner to direct the hot products of combustion to impinge on the inner surface of the discharge opening. The method is employed most effectively when the burners are positioned to apply heat to a segment of the discharge opening 46 adjacent to the discharging metal stream, so as to heat the surface of the refractory just prior to its contact with the liquid metal. Alternatively, the surface of the discharge opening may be heated by electric resistance elements embedded in the refractory. Tungsten, molybdenum or silicon carbide are examples of materials suitable for the elements and high-purity magnesia or alumina for the refractory lip material which encases the elements. Electrical energy can be supplied to the elements in known manner by means of stationary brushes in contact with collector rings attached to, and rotating with, the reactor shell.

Alloys and fluxes, such as carbon, aluminum, calcium carbide and ferrosilicon, may be introduced into the steel and slag near the discharge opening 46 for control of the finished steel composition. One or more injection pipes of known manner of construction and usually water-cooled, may be provided for this purpose, as indicated by the solids injection pipe 35 in the embodiment shown. Material to be injected may flow by gravity or be entrained in gaseous media and injected under pressure through the injection pipe 35 which can be directed either to discharge onto the slag, or downwards through the slag into the bath. Additions by injection may also be made to the liquid steel after discharge and prior to casting.

The liquid steel and slag may be discharged together by overflowing through discharge opening 46 and separated after discharge by slag separation device 48 which may also be heated and of which there are a number of known variations. Alternatively, the steel may be syphoned from the furnace by way of a refractory tube inserted into the furnace through the discharge opening 46 and down into the steel bath. In this event, it may be desirable to discharge the slag intermittently rather than continuously. The steel would be discharged by suction into a closed vessel under controlled negative pressure, or syphoned into a receptacle containing steel at a level lower than the level of liquid steel 23 within the furnace. Steel and slag may also be discharged by way of tapping holes, such as indicated by tap hole 47. Holding furnaces, for example, electric induction-type furnaces, may also be used for accumulation and adjustment of steel composition prior to casting.

It will be appreciated that a preferred embodiment of the method has been described, and that variations may be made by those skilled in the art without departing from the scope of the invention defined in the appended claims.

What is claimed is:

1. The method for continuous steelmaking in an elongated rotary funace which comprises the steps of:
    (a) confining a charge of metallic iron in an elongate steelmaking zone, said zone having a charge end and a discharge end;
    (b) introducing heat directly at the charge end to form a melting zone proximate the point of introduction;
    (c) introducing heat directly at discharge end to form a refining zone proximate the point of introduction;
    (d) introducing iron particles and necessary steelmaking reagents into the melting zone to form molten metal and slag phases in said melting zone;
    (e) advancing said molten phases into said refining zone;
    (f) agitating the metal in contact with the slag in said refining zone by rotation of the furnace;
    (g) controlling the temperature in said refining zone for refining the metatl to form liquid steel and slag of desired composition and temperature; and
    (h) discharging said refined steel and slag from said refining zone.

2. The method for continuous steelmaking in an elongated rotary furnace which comprises the steps of:
    (a) confining a charge of metallic iron in an elongated steelmaking zone, said zone having a charge end and a discharge end;
    (b) rotating the furnace to effect controlled agitation of the charge along the length of the steelmaking zone;
    (c) supplying heat directly at the charge end by injecting for combustion controlled quantities of fuel and oxygen-containing gas to form a melting zone proximate the point of injection;
    (d) supplying heat directly at the discharge end by injecting for combustion controlled quantities of fuel oxygen-containing gas which may be preheated to form a refining zone proximate the point of injection;
    (e) introducing a charge of metallic iron and necessary steelmaking reagents into said melting zone;
    (f) melting the charge in said melting zone to form molten metal and slag phases in close contact;
    (g) advancing the molten phases into said refining zone;
    (h) refining the charge in said refining zone by controlled heating and agitation of the metal in contact with the slag to form liquid steel of the desired composition and temperature; and
    (i) discharging the refined steel and slag from said refining zone.

3. The method of claim 2 wherein step (e) comprises: transferring sponge iron from a preceding solid-state iron ore reduction operation into said melting zone, while conserving residual heat in said iron from said reduction stage.

4. The method of claim 2 further comprising the maintaining a continuous elongated pool of liquid metal and slag along the entire length of the steelmaking zone by an annular restriction of a charge opening at the charge end and an annular restriction of a discharge opening at the discharge end of the steelmaking zone whereby the maximum depth of said pool is governed by the amount of the restriction of said discharge opening and the restriction of said charge opening directly confines said pool to prevent metal and slag outflow from the charge end of the steelmaking zone.

5. The method of claim 2 further comprising the step of: selectively restricting the discharge opening for controlling the rate of slag discharge through said discharge opening and thereby regulating the rate of slag flow along the steelmaking zone.

6. The method for continuous steelmaking in an elongated rotary furnace which comprises the steps of:
    (a) confining a charge of metallic iron in an elongated steelmaking zone, said zone having a charge end and a discharge end;
    (b) rotating the furnace to effect controlled agitation of the charge along the length of the steelmaking zone;
    (c) introducing heat directly at the charge end to form a melting zone proximate the point of introduction;
    (d) introducing heat directly at the discharge end to form a refining zone proximate the point of introduction;
    (e) introducing a charge of pieces of metallic iron and necessary steemaking reagents into said melting zone;
    (f) melting the charge in said melting zone by means of said heat introduced adjacent the charge end supplemented by hot gases exiting from said refining zone to form molten metal and slag phases in close contact;
    (g) advancing the molten phases into said refining zone;
    (h) refining the charge in said refining zone by independently controlling the temperature by means of said heat introduced directly at the discharge end and agitating the metal in contact with the slag to form liquid steel of the desired composition and temperature;
    (i) discharging the refined steel and slag from said refining zone; and
    (j) flowing hot gases in a countercurrent direction relative to the flow of iron and slag, from the refining zone along the elongate steelmaking zone through the melting zone and expelling the hot gases from the charge end of the steelmaking zone; and (k) agitating the charge to promote melting and refining of metal in contact with slag by controlled rotation of cylindrical walls confining said elongated steelmaking zone.

7. The method of claim 6 wherein said heat for melting and for refining are introduced by combustion of controlled quantities of fuel and oxygen-containing gas, supplied from an external source and injected into said charge end and into said discharge end of the steelmaking zone.

8. The method of claim 6 further comprising maintaining a continuous, elongated pool of liquid metal and slag along the entire length of the steelmaking zone by an annular restriction of a charge opening at the charge end and an annular restriction of a discharge opening at the discharge end of the steelmaking zone whereby the maximum depth of said pool is governed by the amount of the restriction of said discharge opening and the restrictions of said charge opening directly confines said pool to prevent metal and slag outflow from the charge end of the steelmaking zone.

9. The method of claim 8 further comprising the step of: sealing said discharge opening by means of an annular gas curtain directed to impinge radially outwards onto the inner surface of the annular discharge end opening thereby limiting the passage of secondary air into the furnace..

10. The method of claim 6 further comprising the step of: sealing said discharge opening by means of an annular gas curtain directed to impinge radially outwards onto the inner surface of the annular discharge end opening thereby limiting the passage of secondary air into the furnace; maintaining the discharge opening for controlling the rate of slag discharge through said discharge opening and thereby regulating the rate of slag flow along the steelmaking zone.

11. A method for continuous steelmaking in an elongated rotary furnace in which the following operations are conducted simultaneously: introducing heat directly into the charge end of the furnace to form a melting zone; introducing heat directly into the discharge end of the furnace to form a refining zone; continuously melting a charge comprising pieces of metallic iron, along with fluxing materials and alloying materials as required, in said melting zone to form liquid metal and slag phases in close contact; advancing the liquid metal and slag from said melting zone into said refining zone; and continuously refining the metal by contact and reaction with the slag under conditions of controlled agitating and advancing action provided by rotation of the inner furnace walls and controlled heating within said refining zone to form liquid steel and slag of the desired composition and temperature for discharge.

12. The method of claim 11 further comprising the step of: maintaining a selected and substantially constant depth of metal within the furnace by means of an annular dam forming a restricted discharge opening.

13. The method of claim 11 further comprising the step of: maintaining a selected and substantially constant depth of metal within the furnace by means of an annular dam forming a restricted discharge opening and controlling the rate of slag discharge through said discharge opening by means of an adjustable barrier placed within said discharge opening thereby regulating the rate of slag flow along the furnace.

14. A method for continuous steelmaking in an elongated rotary furnace having a melting zone heated from the charge end of the furnace and a refining zone independently heated from the discharge end of the furnace, in which the following operations are conducted simultaneously: continuously melting a charge comprising pieces of metallic iron, along with fluxing materials and alloying materials as required, in said melting zone to form liquid metal and slag phases in close contact; advancing the liquid metal and slag from said melting zone into said refining zone; and continuously refining the metal by contact and reaction with the slag under conditions of controlled agitating and advancing action provided by rotation of the inner furnace walls and controlled heating within said refining zone to form liquid steel and slag of the desired composition and temperature for discharge; heating said melting zone by combusting fuel and oxygen-containing gas, and separately and independently heating said refining zone by combusting fuel and oxygen-containing gas while effecting general flow of hot gases countercurrent to the flow of material, said hot gases flowing from said refining zone into and through said melting zone and expelling the hot gases from said charge end of the furnace, said heating of said refining zone thereby providing independent temperature control for refining and the hot combustion products from said refining zone furnishing supplementary heat for melting.

15. A method for continuous steelmaking in an elongated rotary furnace having a melting zone heated from the charge end of the furnace and a refining zone independently heated from the discharge end of the furnace, in which the following operations are conducted simultaneously: continuously melting a charge comprising pieces of metallic iron, along with fluxing materials and alloying materials as required, in said melting zone to form liquid metal and slag phases in close contact; advancing the liquid metal and slag from said melting zone into said refining zone; and continuously refining the metal by contact and reaction with slag under conditions of controlled agitating and advancing action provided by rotation of the inner furnace walls and controlled heating within said refining zone to form liquid steel and slag of the desired composition and temperature for discharge; continually maintaining a selected and substantially constant depth of metal within the furnace by means of an annular dam forming a restricted discharge opening; and continuously heating said melting zone by combusting fuel and oxygen-containing gas, and separately and independently heating said refining zone by combusting fuel and oxygen-containing gas while effecting general flow of hot gases countercurrent to the flow of hot gases countercurrent to the flow of material from said refining zone into and through said melting zone and expelling the hot gases from said charge end of the furnace, said heating of said refining zone thereby providing independent temperature control for refining the hot combustion products from said refining zone providing supplementary heat for melting.

16. A method for continuous steelmaking in an elongated rotary furnace having a melting zone heated from the charge end of the furnace and a refining zone independently heated from the discharge end of the furnace, in which the following operations are conducted simultaneously: continuously melting a charge comprising pieces of metallic iron, along with fluxing materials and alloying materials as required, in said melting zone to form liquid metal and slag phases in close contact; advancing the liquid metal and slag from said melting zone into said refining zone; and continuously refining the metal by contact and reaction with the slag under conditions of controlled agitating and advancing action provided by rotation of the inner furnace walls and controlled heating within said refining zone to form liquid steel and slag of the desired composition and temperature for discharge; continually maintaining a selected and substantially constant depth of metal within the furnace by means of an annular dam forming a restricted discharge opening; and continuously heating said melting zone by combusting fuel and oxygen-containing gas, and separately and independently heating said refining zone by combusting fuel and oxygen-containing gas while sealing said discharge opening by means of an annular gas curtain directed to impinge radially outwards onto the inner surface of the annular discharge end opening thereby limiting the passage of secondary air into the furnace and, at the same time, effecting general flow of hot gases countercurrent to the flow of material from said refining zone into and through said melting zone and expelling the hot gases from said charge end of the furnace, said heating of said refining zone thereby providing independent temperature control for refining and the hot combustion products from said refining zone providing supplementary heat for melting.

17. In a method for continuous steelmaking in an elongated rotary furnace, the combination comprising the following operations conducted simultaneously; continually melting a charge mixture comprising metallic iron pellets along with fluxing materials and alloying materials as required thereby forming liquid metal and slag phases in close contact; continually supplying heat for melting directly by combusting fuel and oxygen-containing gas directed into the charge end of the rotary furnace; continually refining liquid metal and slag thereby obtaining liquid steel and slag of a desired composition and temperature for discharge; continually supplying heat for refining directly by combusting fuel and oxygen containing gas directed into the discharge end of the rotary furnace; and continually agitating the charge mixture by rotating the furnace thereby facilitating heat transfer and chemical reactions for melting and for refining of the metal in contact with the slag.

18. A method according to claim 17 in which hot gases continually flow along the rotary furnace countercurrent to the general movement of charge mixture, and said hot gases are expelled from the charge end of the rotary furnace.

References Cited
UNITED STATES PATENTS

| | | | |
|---|---|---|---|
| 1,366,383 | 1/1921 | Hillhouse | 75—39 X |
| 2,526,473 | 10/1950 | Gilliland | 75—43 |
| 3,169,055 | 2/1965 | Josefsson et al. | 75—40 |
| 3,326,671 | 6/1967 | Worner | 75—40 |
| 3,326,672 | 6/1967 | Worner | 75—60 X |

HENRY W. TARRING, II, Primary Examiner

U.S. Cl. X.R.

75—38, 39